United States Patent
Hahn et al.

(10) Patent No.: US 8,208,429 B2
(45) Date of Patent: Jun. 26, 2012

(54) METHOD FOR PERFORMING INITIAL RANGING IN WIRELESS COMMUNICATION SYSTEM

(75) Inventors: Gene Beck Hahn, Anyang-si (KR); Yong Ho Kim, Anyang-si (KR); Ki Seon Ryu, Anyang-si (KR)

(73) Assignee: LG Electronics Inc., Seoul (KR)

(*) Notice: Subject to any disclaimer, the term of this patent is extended or adjusted under 35 U.S.C. 154(b) by 340 days.

(21) Appl. No.: 12/596,367

(22) PCT Filed: Apr. 16, 2008

(86) PCT No.: PCT/KR2008/002138
§ 371 (c)(1),
(2), (4) Date: Oct. 16, 2009

(87) PCT Pub. No.: WO2008/130127
PCT Pub. Date: Oct. 30, 2008

(65) Prior Publication Data
US 2010/0118833 A1    May 13, 2010

(30) Foreign Application Priority Data
Apr. 18, 2007  (KR) .................. 10-2007-0037786

(51) Int. Cl.
*H04W 4/00* (2009.01)

(52) U.S. Cl. ........................................ 370/328; 455/436
(58) Field of Classification Search .................. None
See application file for complete search history.

(56) References Cited

U.S. PATENT DOCUMENTS

| | | | |
|---|---|---|---|
| 2005/0192011 A1 | 9/2005 | Hong et al. | |
| 2005/0250499 A1* | 11/2005 | Lee et al. | 455/437 |
| 2007/0076684 A1* | 4/2007 | Lee et al. | 370/350 |
| 2007/0091822 A1* | 4/2007 | Do et al. | 370/254 |
| 2010/0093347 A1* | 4/2010 | Hahn et al. | 455/435.1 |
| 2011/0268081 A1* | 11/2011 | Bourlas et al. | 370/330 |

FOREIGN PATENT DOCUMENTS
WO   WO-2005/040960 A2   5/2005

* cited by examiner

Primary Examiner — Anh-Vu Ly
(74) Attorney, Agent, or Firm — Birch, Stewart, Kolasch & Birch, LLP

(57) ABSTRACT

A method of performing initial ranging in a wireless communication system includes transmitting a ranging request message and receiving a ranging response message including a temporary identifier for a mobile station which transmits the ranging request message. By using the temporary identifier which identifies the mobile station before establishing authentication, it is possible to prevent the MAC address from being exposed to a malicious attacker through a wireless interface and to secure location privacy.

3 Claims, 4 Drawing Sheets

[Fig. 1]
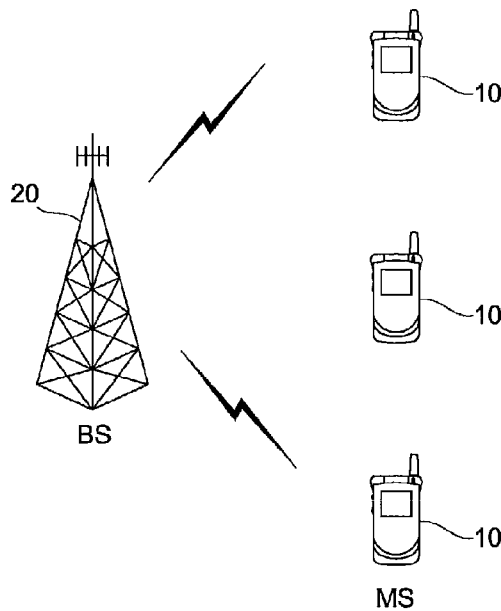
[Fig. 2]
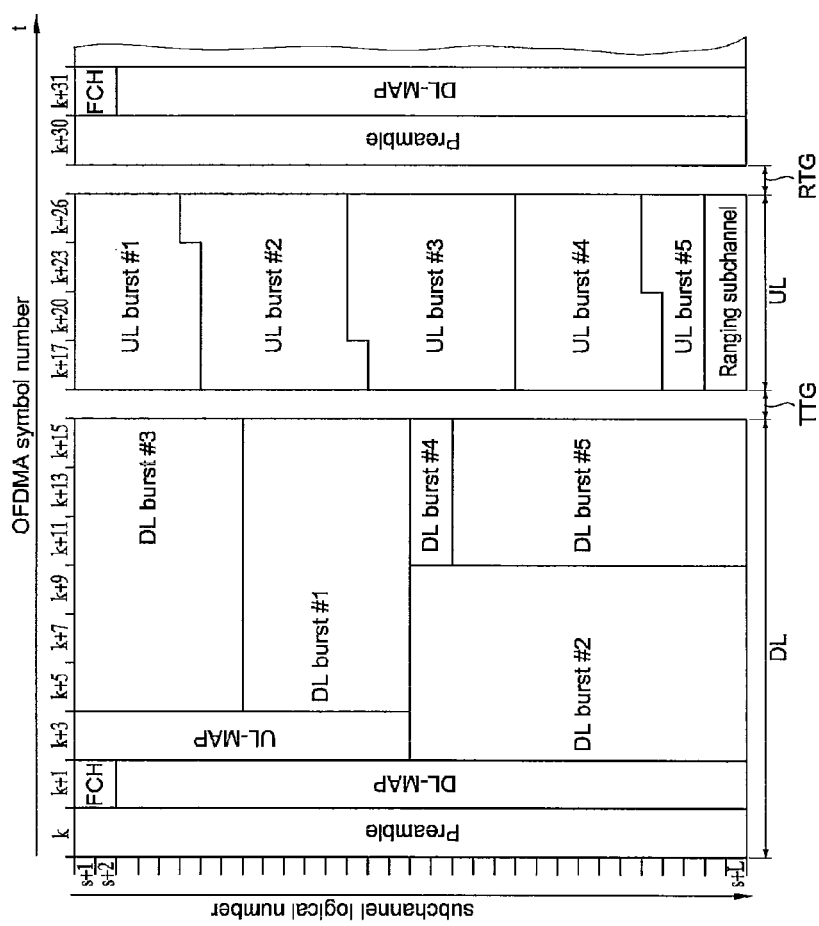

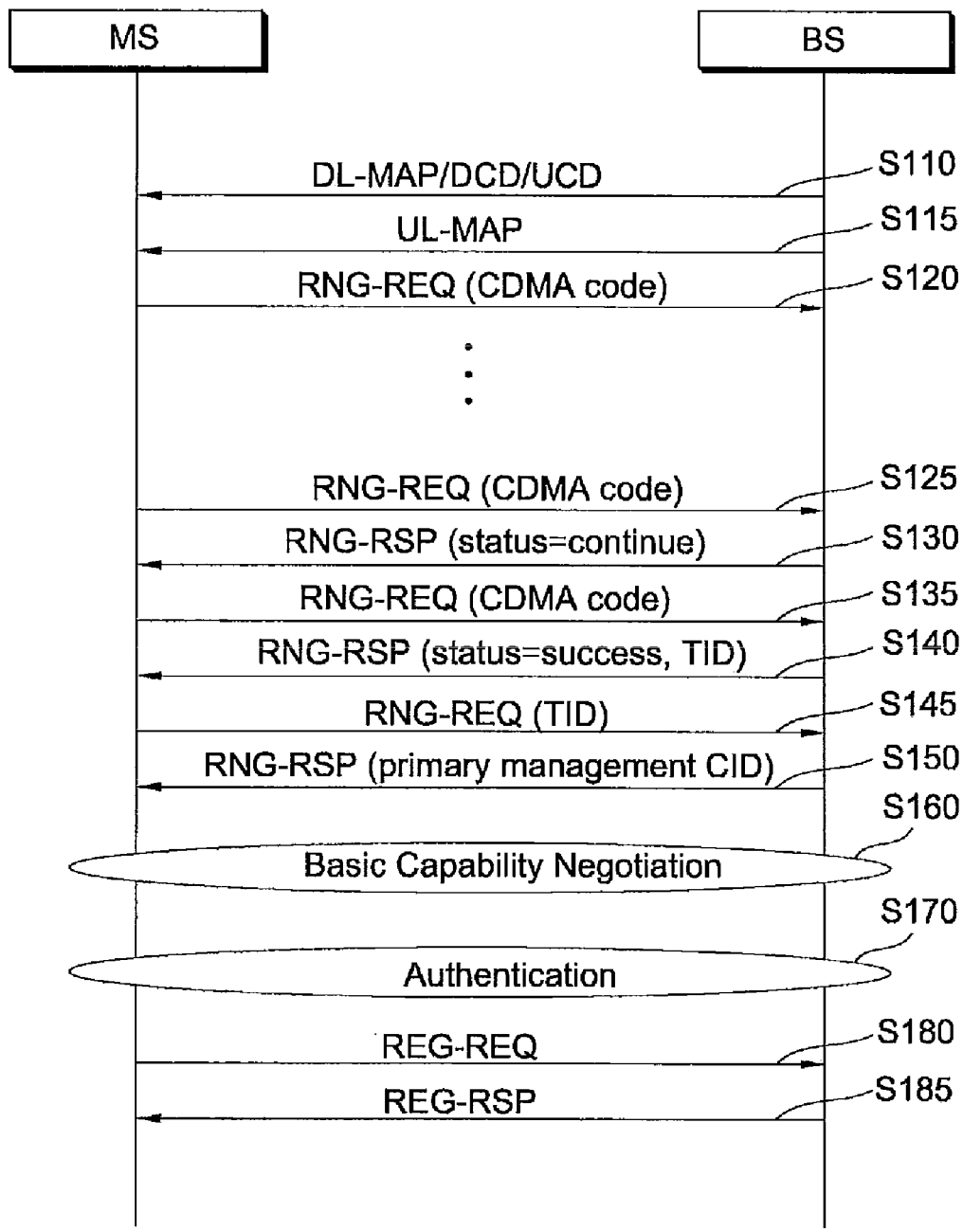
[Fig. 3]

[Fig. 4]
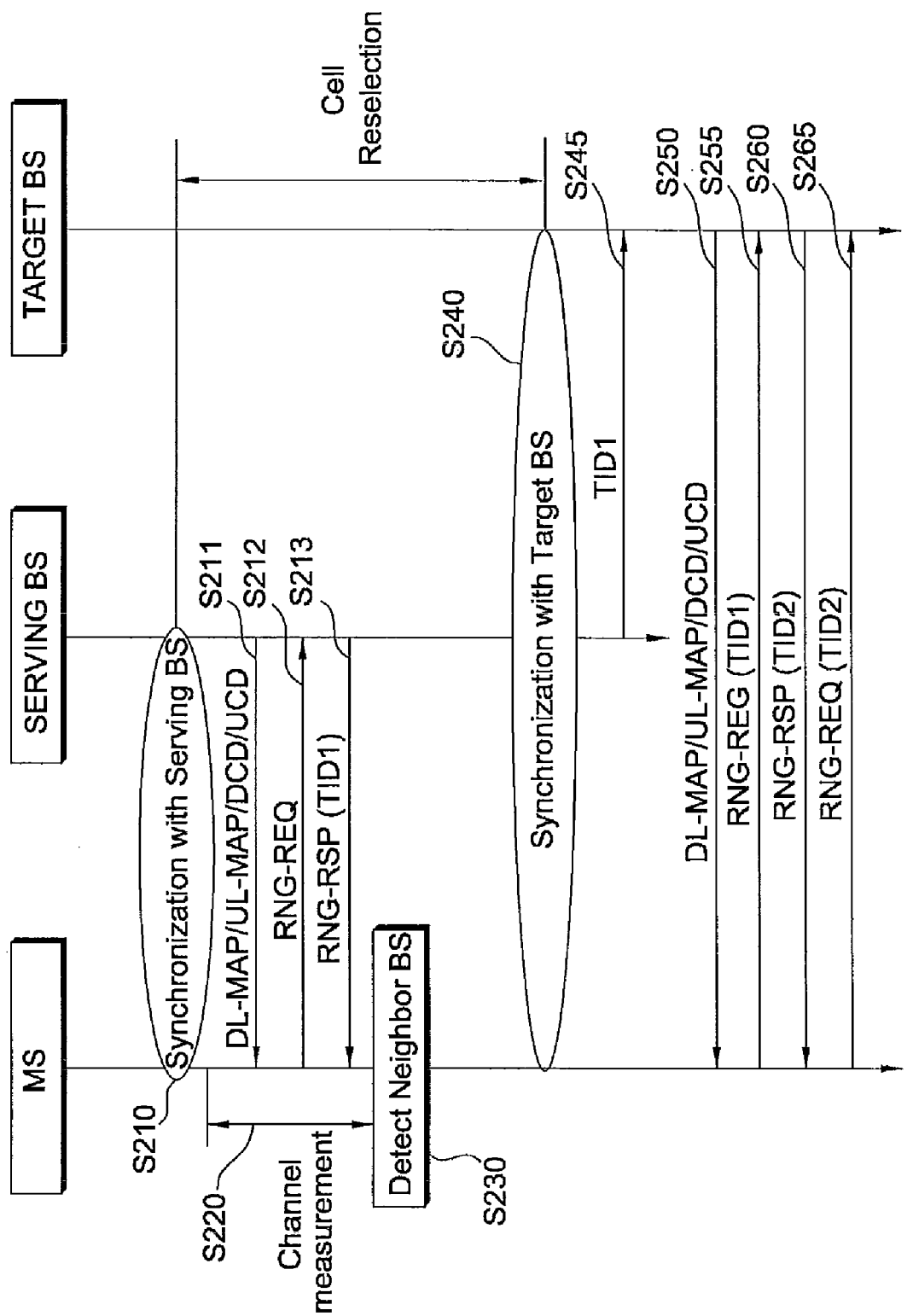

[Fig. 5]
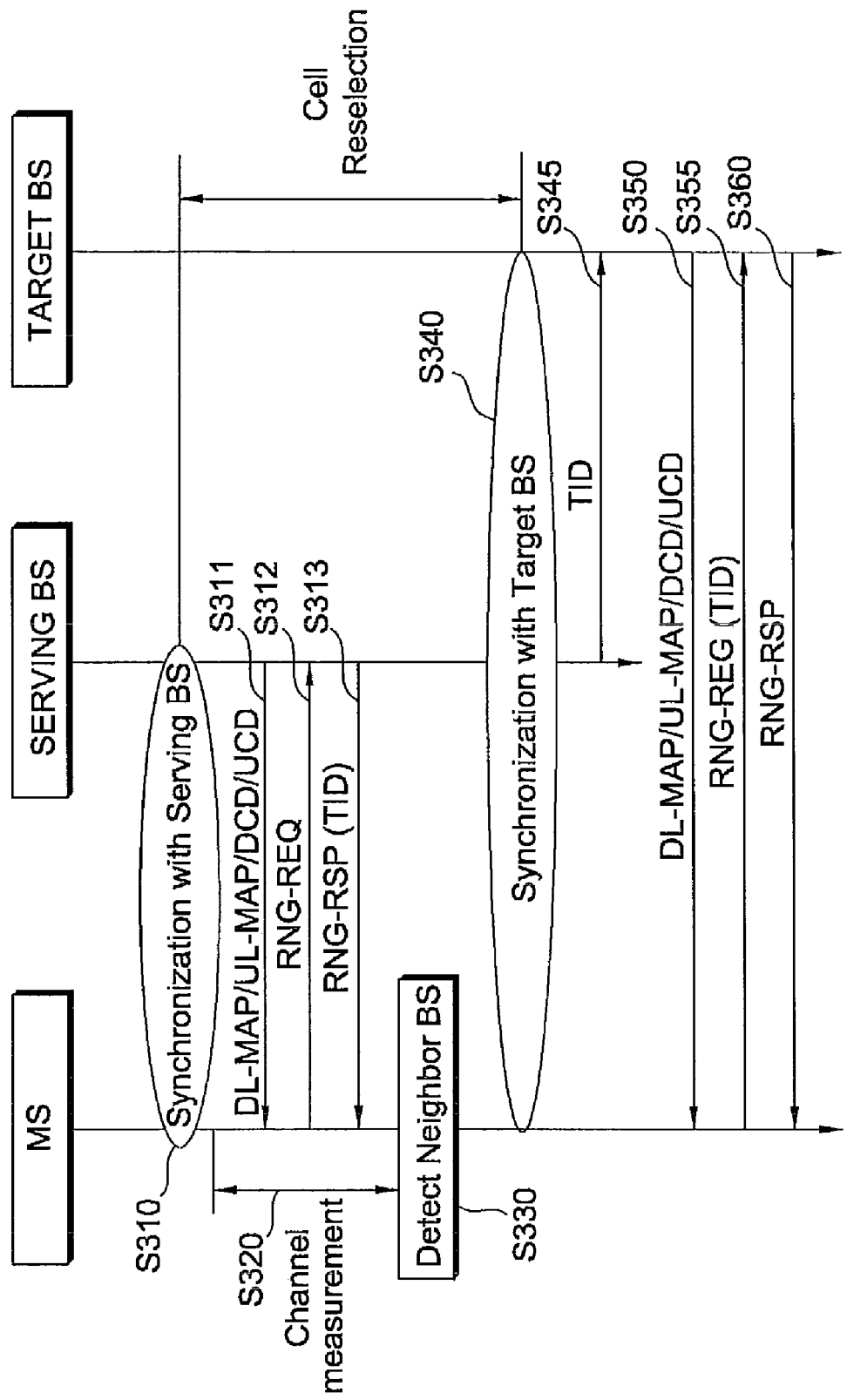

METHOD FOR PERFORMING INITIAL RANGING IN WIRELESS COMMUNICATION SYSTEM

TECHNICAL FIELD

The present invention relates to wireless communication, and more particularly, to a method of performing initial ranging to support location privacy in a wireless communication system.

BACKGROUND ART

A next generation multimedia wireless communication system that has been actively researched is required to process not only voices but also images, packet data and the like.

Location based services such as an emergency rescue service or a child monitoring service are one of next generation services. However, unsecured location based services may be vulnerable to an unauthorized access that steals location information of a mobile station (MS). If the location information of the MS is exposed, the location information may be used for unauthorized access and undesired exploitation. Accordingly, it is essential to protect privacy of location information of the MS in a wireless communication system. Capability of protecting the location information of the MS against unknown exploiters is called as location privacy.

Orthogonal frequency division multiplexing (OFDM) is a multi-carrier modulation technique using a plurality of orthogonal subcarriers. Orthogonal frequency division multiple access (OFDMA) is a technique for providing multiplexing of multi-users by combining the OFDM with frequency division multiple access (FDMA) or time division multiple access (TDMA).

IEEE (Institute of Electrical and Electronics Engineers) 802.16 standard is based on the OFDM/OFDMA. In the IEEE 802.16 standard, ranging is a collection of processes by which a MS and a BS maintain the quality of the RF communication link between them. The ranging consists of two types: initial ranging and periodic ranging. The first serves to initiate registration (or re-registration) of a MS with a base station (BS). The second served to periodically readjust physical parameters of the MS and to verify that the MS is still on line. The initial ranging is needed for a procedure in which the MS registers with the BS or a handover.

Hereinafter, downlink indicates communication from the BS to the MS, and uplink indicates communication from the MS to the BS.

Initial ranging is the procedure to obtain an accurate timing offset between the MS and the BS and to adjust transmission power. When a MS is turned on, the MS achieves downlink synchronization from downlink preambles. Subsequently, the MS performs the initial ranging so as to adjust uplink timing offset and transmission power. After the initial ranging is completed, periodic ranging is periodically performed to track uplink timing offset and received signal strength.

In general, after initial ranging is completed, authentication between the MS and the network is performed to allocate a message authentication code. The message authentication code is used to protect messages which are exchanged between a MS and a BS from being exposed to another MS. However, a method of protecting location privacy before the authentication between the MS and the network is completed is not disclosed.

A method is sought of preventing the location information of the user from being exposed before the authentication between the MS and the network is completed.

DISCLOSURE OF INVENTION

Technical Problem

A method of performing initial ranging to support location privacy is provided.

A method of performing handover to support location privacy is provided.

Technical Solution

According to an aspect of the present invention, a method of performing initial ranging in a wireless communication system includes transmitting a ranging request message and receiving a ranging response message including a temporary identifier for a mobile station which transmits the ranging request message.

According to another aspect of the present invention, a method of enabling a target base station to perform handover in a wireless communication system includes receiving a first temporary identifier from a serving base station, receiving a ranging request message including the first temporary identifier from a mobile station and transmitting a ranging response message to the mobile station, the ranging response message including a second temporary identifier used for initial ranging.

According to still another aspect of the present invention, a method of performing initial ranging in a wireless communication system includes receiving a ranging request message and transmitting a ranging response message including a temporary identifier for a mobile station which transmits the ranging request message.

ADVANTAGEOUS EFFECTS

When initial ranging is performed to enter a network or perform handover, a temporary identifier for a mobile station is allocated. The temporary identifier identifies the mobile station before establishing authentication. Accordingly, it is possible to prevent the MAC address from being exposed to a malicious attacker through a wireless interface and to secure location privacy.

BRIEF DESCRIPTION OF THE DRAWINGS

FIG. 1 is a block diagram illustrating a wireless communication system.

FIG. 2 illustrates an example of a frame structure.

FIG. 3 is a flowchart illustrating a procedure of initializing a network according to an embodiment of the present invention.

FIG. 4 is a flowchart illustrating a handover procedure according to an embodiment of the present invention.

FIG. 5 is a flowchart illustrating a handover procedure according another embodiment of the present invention.

MODE FOR THE INVENTION

FIG. 1 is a block diagram illustrating a wireless communication system. The wireless communication system is widely disposed so as to provide various communication services such as services for providing voices, packet data, and the like.

Referring to FIG. 1, a wireless communication system includes a mobile station (MS) 10 and a base station (BS) 20. The MS 10 may be fixed or mobile. The MS 10 may be referred to as user equipments (UEs), user terminals (UTs), subscriber stations (SSs), or wireless devices. The BS 20 refers to a fixed station that communicates with the MS 10. The BS 20 may be referred to as a NodeB, a base transceiver system (BTS), or an access point. The BS 20 serves at least one cell.

The wireless communication system may be an orthogonal frequency division multiplexing/orthogonal frequency division multiple access (OFDM/OFDMA) based system. The OFDM uses a plurality of orthogonal subcarriers. The OFDM uses orthogonal characteristic between inverse fast Fourier transformation (IFFT) and fast Fourier transformation (FFT). A transmitter transmits data by performing the IFFT. A receiver recovers original data by performing the FFT. The transmitter uses the IFFT so as to combine multiple subcarriers. In order to split the multiple subcarriers, the receiver uses the FFT corresponding to the IFFT. Hereinafter, a slot is the minimum possible data allocation unit and is defined as a subchannel and a time. In uplink direction, the subchannel may be constructed with a plurality of tiles. The subchannel may be constructed with six tiles. In uplink direction, a burst may be constructed with three OFDM symbols and a subchannel. In permutation of partial usage of subchannels (PUSC), each tile may include four contiguous subcarriers over three OFDM symbols. Alternatively, each tile may include three contiguous subcarriers over three OFDM symbols. A bin includes nine contiguous subcarriers in an OFDM symbol. A band indicates a group of four rows of the bin. An adaptive modulation and coding (AMC) subchannel is constructed with six contiguous bins in the same band.

FIG. 2 illustrates an example of a frame structure. A frame is a data sequence used by physical specifications during a fixed time.

Referring to FIG. 2, a frame includes an uplink frame and a downlink frame. In time division duplex (TDD), uplink and downlink transmission share the same frequency at different times. The downlink frame antecedes the uplink frame. The downlink frame starts in the order of a preamble, a frame control header (FCH), a downlink-map (DL-MAP), a uplink-map (UL-MAP), and burst zones. There are guard times for distinguishing the uplink frame from the downlink frame at center part (between the downlink and uplink frames) and last part (next to the uplink frame). A transmit/receive transition gap (TTG) indicates a gap between a downlink burst and a subsequent uplink burst. A receive/transmit transition gap (RTG) indicates a gap between an uplink burst and a subsequent downlink burst.

The preamble is used to initially synchronize a MS with a BS, search for a cell, and estimate a frequency offset and a channel. The FCH includes a length of a DL-MAP message and coding scheme information for the DL-MAP.

The DL-MAP is an area to which the DL-MAP message is transmitted. The DL-MAP message defines an access of a downlink channel. The DL-MAP message includes a configuration change count of a downlink channel descriptor (DCD) and an identifier (ID) of a BS. The DCD describes a downlink burst profile to be applied to a current MAP. The downlink burst profile represents characteristics of a downlink physical channel. The DCD is periodically transmitted by the BS through the DCD message.

The UL-MAP is an area to which the UL-MAP message is transmitted. The UL-MAP message defines an access of an uplink channel. The UL-MAP message includes a configuration change count of an uplink channel descriptor (UCD) and a valid start time of uplink allocation defined by the UL-MAP. The UCD describes an uplink burst profile. The uplink burst profile represents characteristics of an uplink physical channel. The UCD is periodically transmitted by the BS through the UCD message. The UCD message includes information on a backoff window for ranging.

FIG. 3 is a flowchart illustrating a procedure of initializing a network according to an embodiment of the present invention. Network initialization represents a procedure in which a MS initially enters the network. By the initial ranging, the MS obtains an accurate timing offset and adjusts transmission power.

Referring to FIG. 3, a MS reads a DL-MAP message transmitted from a BS (step S110). When the MS is turned on or lose connection, the MS needs to obtain a downlink channel. The MS receives a frame structure by scanning a wireless channel and synchronizes with the BS. When receiving at least one DL-MAP message, the MS can achieve medium access control (MAC) synchronization. When achieving the MAC synchronization, the MS can continuously receive the DL-MAP message, a DCD message and a UCD message. After synchronization, the MS waits for a UCD message from the BS and obtains a transmission parameter on an available uplink channel. The UCD message includes a time when a ranging request is to be transmitted and a frequency in which the ranging request is to be transmitted. The UCD message may specify one or more groups of six (or eight) contiguous subchannels for which a contention based ranging is performed. The contention based ranging indicates a process in which at least one MS can transmit data through the same subchannel at the same time.

In order to search for an initial ranging interval, the MS reads a UL-MAP message (step S115). The BS allocates the initial ranging interval constructed with at least one transmission opportunity. The transmission opportunity indicates an allocation provided by the UL-MAP so that an authorized predetermined group of MSs transmit an initial ranging request.

The MS transmits a ranging request (RNG-REQ) message (step S120). The ranging request message determines a network delay. The ranging request message is transmitted from the MS so as to request a change in power and/or downlink burst profile when initializing the network. The MS randomly selects a ranging slot in a backoff window included in the UCD and randomly selects a code division multiple access (CDMA) code from a series of CDMA codes. The CDMA code may use a pseudo-random bit sequence (PRBS) binary phase shift keying (BPSK) code. MSs which transmit the ranging request message through the same ranging slot at the same time are in a contention state.

When there is no response from the BS, the MS transmits a ranging request message by increasing a power level in the next contention slot (step S125).

The BS transmits a ranging response (RNG-RSP) message to indicate that the CDMA code is successfully received (step S130). Since the BS does not know which MS transmits the CDMA code, the BS designates the CDMA code and a slot so as to enable the MS to confirm itself. The ranging response message is a broadcast message. The BS determines a symbol timing offset due to a transmission delay, a Doppler shift or a frequency offset due to inaccuracy of an oscillator, receiving power, and the like. The BS transmits correction data to the MS by using this information. The MS continues to perform the ranging until power, timing, and a frequency are aligned. The ranging response message includes information on a ranging status. When the ranging status is 'continue', although the transmission attempt is not successful, the MS performs a correction process designated by the ranging response message and registers another CDMA code after a suitable backoff delay.

When the ranging status of the received ranging response message is 'continue', the MS continuously transmits the CDMA code through the ranging request message (step S135). The MS updates the timing and the power designated by the ranging response message and transmits the ranging request message.

The BS transmits the ranging response message of which ranging status is 'success' and allocates a bandwidth to a specific MS (step S140). The BS continues to perform fine tuning process through the ranging response message. The ranging request/response processes are repeated until the BS transmits a ranging response message including the ranging status which is successful or abort. The BS transmits a temporary identifier (TID) to the MS when the ranging status is successful. The temporary identifier is temporarily used to identify the MS during the ranging. The ranging is a contention based process. Accordingly, when the ranging is successfully performed, an identifier for identifying the corresponding MS is necessary. At this time, in a case where the unique identifier of the MS such as the MAC address is transmitted as an identifier, location privacy problem may occur. The MAC address is allocated in a manufacturing procedure and used to identify the MS. The unique identifier of the MS which is used for a universal mobile telecommunication system (UMTS) may be an international mobile subscriber identity (IMSI) or international mobile equipment identity (IMEI). The IMSI is a private record stored in a subscriber identify module (SIM) and a home location register (HLR). The IMEI discloses a terminal manufacturer, a model number, and a serial number. In order to prevent the unique identifier of the MS from being exposed to a malicious attacker while not causing a serious load in the network, the BS allocates the temporary identifier that is to be temporarily used by the MS during an initial ranging. Accordingly, the unique identifier may not be exposed before establishing authentication.

The MS transmits a ranging request message including the temporary identifier through the allocated slot (step S145). The MS returns the temporary identifier, which is received from the ranging response message, through the ranging request message, so that the temporary identifier is confirmed.

The BS identifies the MS through the received unique identifier and transmits the ranging response message including a ciphered primary management connection identifier (CID) (step S150). A CID indicates a value for confirm connection between the BS and the MS in MAC. The primary management CID indicates a CID for connection that is established during the initial ranging and used to transmit a delay-tolerant MAC message. Accordingly, the initial ranging is completed.

The BS and the MS negotiates basic capability (step S160). Immediately when the ranging is completed, the MS transmits a basic capability request (SBS-REQ) message including basic capability of its own. The basic capability message includes information on whether an automatic repeat request (ARQ) is supported and information on whether a MAC level cyclic redundancy check (CRC) is supported. The BS transmits a basic capability response (SBC-RSP) message in response to the basic capability request message.

The MS and the BS authenticates each other and exchanges an authorization key (step S170).

The MS transmits a registration request (REG-REQ) message (step S180). The registration request message includes the primary management CID.

The BS transmits the registration response (REG-RSP) message in response to the registration request message (step S185). The registration response message includes a secondary management CID. The secondary management CID is established while registering the MS. The secondary management CID relates to a connection used to transmit a standards-based message such as a simple network management protocol (SNMP) or dynamic host configuration protocol (DHCP).

After registering the MS, IP connectivity is established, time of day is established, and other operation parameters are transmitted. Consequently, the connection is set up.

The initial ranging is performed when the MS wants to access the network and is constructed with a series of exchanges of ranging request messages and ranging response messages. During the initial ranging, the unique identifier of the MS may be exposed to a malicious attacker if the unique identifier is transmitted to the network without considering location privacy. The location privacy can be called as an active or passive attack with respect to the unique identity of the MS. The location privacy includes hijack of the MS's identifier exchanged between the network and the MS and various attacks using MS's identifier. For example, the malicious attacker that obtains the MAC address may pretend to be a normal MS. According to a proposed method, a threat of exposing the MAC address of the MS is resolved by allocating a temporary identifier which is temporarily used by the MS while performing the initial ranging until establishing authentication. The BS transmits a temporary identifier to the MS in the ranging response message for reporting that the ranging is successfully performed. The BS can keep associations among a temporary identifier, MAC address and a CID before establishing authentication.

FIG. 4 is a flowchart illustrating a handover procedure according to an embodiment of the present invention. Handover is a procedure that a MS moves from a wireless interface provided by a BS to a wireless interface provided by another BS. The handover may be referred to as handoff. A serving BS is a BS in which registration of an MS is most recently completed. A target BS is a BS in which the MS is to be registered as the result of the handover. A neighbor BS indicates a BS that is not a serving BS.

Referring to FIG. 4, a MS obtains synchronization with a serving BS (step S210). The MS obtains a downlink parameter and an uplink parameter by receiving a DL-MAP message, a UL-MAP message, a DCD message, and a UCD message (step S211). The MS starts initial ranging by transmitting a ranging request message (step S212). When the ranging is successful, the serving BS transmits a ranging response message including a first temporary identifier TID1 (step S213). The first temporary identifier TID1 is a temporary identifier used for the initial ranging between the MS and the serving BS.

The MS continuously measures a channel after obtaining synchronization with the serving BS (step S220). The MS detects the neighbor BS (step S230). The MS can reflect information obtained from a neighbor advertisement (NBR-ADV) message so as to search for an available neighbor BS. Cell reselection is a procedure that the MS searches for neighbor BSs and determines suitability thereof in consideration of performance of the neighbor BSs.

The handover initiates when the MS determines the handover from the serving BS to the target BS. The handover may be originated from the MS or the serving BS. The serving BS may transmit a BS handover request (BSHO-REQ) message when initiating the handover. The MS may transmit a MS handover request (MSHO-REQ) message when initiating the handover. The serving BS may transmit a BS handover response (BSHO-RSP) message in response to the MSHO-REQ message. When the MSHO-REQ message is transmitted by the MS, the MS may indicate one or more available target BSs. When the BSHO-REQ message is transmitted by the serving BS, the serving BS may indicate one or more available target BSs.

The MS transmits a handover indication (HO-IND) message to start the handover. The serving BS can terminate a service with the MS according to the HO-IND message. When the MS cancels or rejects the handover, the MS transmits the HO-IND message together with a suitable field.

The MS synchronizes with the target BS (step S240). As the handover starts, the serving BS transmits the first temporary identifier (TID1) to the target BS (step S245). Although in FIG. 4, the first temporary identifier TID1 is transmitted after the MS synchronizes with the target BS, the first temporary identifier TID1 may be transmitted before the MS synchronizes with the target BS. The first temporary identifier TID1 may be transmitted after the serving BS receives the HO-IND message. In the handover, mapping information between the MAC address of the MS and the first temporary identifier TID1 are exchanged between the serving BS and the target BS. That is, when a handover notification message is to be transmitted, the mapping information between the MAC address of the MS and the first temporary identifier TID1 may be used to identify the MS. Consequently, the target BS can recognize the MAC address of the MS, which is mapped to the first temporary identifier TID1 previously allocated by the serving BS.

The MS obtains a downlink parameter and an uplink parameter by receiving a DL-MAP message, a UL-MAP message, a DCD message and a UCD message (step S250).

The MS starts initial ranging by transmitting a ranging request message including the first temporary identifier TID1 (step S255). The MS performs the initial ranging for initializing with the target BS. At this time, the MS transmits a ranging request message including the first temporary identifier TID1 instead of a unique identifier such as the MAC address of the MS so as to identify the MS. When the MS performs the initial ranging with the target BS, the MS transmits the first temporary identifier TID1 allocated by the previous serving BS to the target BS.

The target BS identifies the MS through the first temporary identifier TID1 and transmits a ranging response message including a second temporary identifier TID2 (step S260). The second temporary identifier TID2 is used to identify the MS during the initial ranging between the MS and the target BS. The target BS that receives the first temporary identifier TID1 can identify the MS that transmits the first temporary identifier TID1 through mapping information between the MAC address of the MS and the first temporary identifier TID1. The target BS allocates the second temporary identifier TID2 that can be used in an area served by the target BS to the MS and maintains association for newly updated CIDs. Accordingly, it is possible for different BSs to allocate different temporary identifiers.

The MS transmits a ranging request message including the second temporary identifier (step S265).

As described above, during the initial ranging, a temporary identifier is allocated to the MS until the authentication is completed. Accordingly, it is possible to prevent the MAC address from being exposed to a malicious attacker through a wireless interface and to secure location privacy. The MAC address is uniquely allocated by a manufacturer for each MS and basically used to identify the MS so as to authenticate the MS. Thus, protection of the MAC address is essentially provided in the MAC layer.

FIG. 5 is a flowchart illustrating a handover procedure according another embodiment of the present invention.

Referring to FIG. 5, an MS obtains synchronization with a serving BS (step S310). The MS obtains a downlink parameter and an uplink parameter by receiving a DL-MAP message, a UL-MAP message, a DCD message and a UCD message (step S311). The MS starts initial ranging by transmitting a ranging request message (step S312). When the ranging is successful, the serving BS transmits a ranging response message including a temporary identifier TID (step S313). The temporary identifier TID is a temporary identifier used for the initial ranging between the MS and the serving BS.

The MS continuously measures a channel after obtaining synchronization with the serving BS (step S320). The MS detects the neighbor BS (step S330).

When the handover starts, the MS synchronizes with the target BS (step S340). As the handover starts, the serving BS transmits the temporary identifier TID to the target BS (step S345). The temporary identifier TID may be transmitted after the serving BS receives a HO-IND message. In the handover, mapping information between the MAC address of the MS and the temporary identifier TID is exchanged between the serving BS and the target BS.

The MS obtains a downlink parameter and an uplink parameter by receiving a DL-MAP message, a UL-MAP message, a DCD message and a UCD message (step S350).

The MS starts the initial ranging by transmitting a ranging request message including the temporary identifier TID (step S255). The target BS identifies the MS through the temporary identifier TID and transmits a ranging response message (step S360). At this time, if the temporary identifier TID is unique in the serving BS and the target BS, the target BS can immediately complete the initial ranging through the received temporary identifier TID without allocating any another temporary identifier.

All the aforementioned functions may be performed by a processor such as a microprocessor, a controller, a microcontroller, an application specific integrated circuit (ASIC), and the like according to software or program codes which are coded so as to perform the aforementioned function. It will be obvious to those skilled in the art to design, develop, and embody the codes based on the description of the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of performing initial ranging by a mobile station in a wireless communication system, the method comprising:
    transmitting a first ranging request message to a base station;
    receiving a first ranging response message from the base station, the first ranging response message including a temporary identifier of the mobile station and information on a ranging status indicating that the initial ranging is successful;

transmitting a second ranging request message including the temporary identifier to the base station for confirming the temporary identifier; and receiving a second ranging response message including a ciphered primary management connection identifier (CID) of the mobile station from the base station, the ciphered primary management CID indicating a CID for a connection established during the initial ranging, the CID having a value for confirming a connection between the base station and the mobile station in a media access control (MAC).

2. The method of claim 1, wherein at least one of the first and second ranging request messages are a code division multiple access (CDMA) that is randomly selected from a set of CDMA codes.

3. A method of performing initial ranging by a base station in a wireless communication system, the method comprising:

receiving a first ranging request message from a mobile station;

transmitting a first ranging response message to the mobile station, the first ranging response message including a temporary identifier for a mobile station and information on a ranging status indicating that the initial ranging is successful;

receiving a second ranging request message including the temporary identifier from the mobile station;

identifying the mobile station based on the temporary identifier included in the second ranging request message; and transmitting a second ranging response message to the mobile station, the second ranging response message including a ciphered primary management connection identifier (CID) for the mobile station, the ciphered primary management CID indicating a CID for a connection established during the initial ranging, the CID having a value for confirming a connection between the base station and the mobile station in a media access control (MAC).

* * * * *